United States Patent [19]

Knirck

[11] Patent Number: 5,711,245
[45] Date of Patent: Jan. 27, 1998

[54] METHOD AND APPARATUS FOR TEMPORARILY EXTENDED ALIGNMENT GUIDE FOR VEHICLE FLUID OUTLET PORT

[75] Inventor: Kenneth John Knirck, San Luis Obispo, Calif.

[73] Assignee: Valterra Products Inc., San Fernando, Calif.

[21] Appl. No.: 344,129

[22] Filed: Nov. 23, 1994

[51] Int. Cl.⁶ ............................................. G08B 5/00
[52] U.S. Cl. .................... 116/28 R; 116/201; 116/303; 340/686
[58] Field of Search ................... 116/28 R, 281, 116/282, 303, 201; 33/264; 280/477; 340/431, 433, 487, 932.2, 480, 488, 489, 490, 686, 687; 40/218

[56] References Cited

U.S. PATENT DOCUMENTS

| | | |
|---|---|---|
| 1,728,079 | 9/1929 | Power ................................. 116/28 R |
| 1,871,532 | 8/1932 | Kenna ................................. 33/264 |
| 2,664,634 | 1/1954 | Giblin et al. ....................... 33/264 |
| 2,672,841 | 3/1954 | Nitzberg ............................. 116/28 R |
| 3,848,244 | 11/1974 | Young et al. ...................... 340/286 |
| 3,858,924 | 1/1975 | Bores ................................. 116/28 R X |
| 3,863,594 | 2/1975 | Gawthrop ........................... 116/28 R |
| 4,640,213 | 2/1987 | Lugo .................................. 116/28 R |
| 4,782,784 | 11/1988 | Little ................................. 116/303 |
| 4,871,995 | 10/1989 | Hoang ............................... 116/303 X |
| 5,035,441 | 7/1991 | Murray ............................. 116/28 R X |
| 5,199,754 | 4/1993 | Freeman ........................... 116/28 R X |
| 5,269,554 | 12/1993 | Law et al. ........................ 280/477 |
| 5,430,625 | 7/1995 | Abarr et al. ..................... 362/80 |

FOREIGN PATENT DOCUMENTS 119451  5/1989  Japan ................................. 116/28 R

*Primary Examiner*—William A. Cuchlinski, Jr.
*Assistant Examiner*—Willie Morris Worth

[57] ABSTRACT

An alignment guide for indicating the location of a waste water outlet port of a large vehicle, such as a motor home, which is not directly visible to the driver of the vehicle. This device is comprised of a brightly-colored indicator flag which is attached to the distal end of an extending arm. The proximal end of the extending arm is mounted directly to, or near the vehicle's waste water drain. When extended, the indicator flag offers the driver of the vehicle a reference point by which he may align the vehicle to the waste water receptacle.

5 Claims, 5 Drawing Sheets

← FRONT OF VEHICLE

METHOD AND APPARATUS FOR TEMPORARILY EXTENDED ALIGNMENT GUIDE FOR VEHICLE FLUID OUTLET PORT

BACKGROUND OF THE INVENTION

This invention relates in general to the operation of recreational vehicles, specifically to aid in alignment of the vehicle to refueling pumps, waste water disposal dumps, and electrical utilities connections. In the course of normal operation, recreational vehicles such as motor homes and travel trailers must periodically stop to refuel or to dump waste water. In order for the fueling or dumping hose to reach the appropriate port on the side of the vehicle, the vehicle must be aligned very closely to the fueling or dumping apparatus. This precise alignment can be very difficult considering the length of these types of vehicles (up to 40 feet) and the fact that the fueling and dumping ports are located at the rear of the vehicle and flush with, or several inches inset from the side of the vehicle.

Typically, the procedure for aligning the vehicle to the fueling or dumping station will take several attempts by the driver before adequate alignment is achieved. These repeated attempts at alignment require the driver to exit the vehicle, walk to the back of the vehicle, and make a visual inspection of the alignment. If the alignment is unsatisfactory, the driver must then re-enter the vehicle and move it either forward or backward. This procedure often requires two or three adjustments before fueling or dumping can commence.

Until now, there has been no easy way for the driver of a large vehicle such as a motor home to see adequately, from the driver's seat, the fueling and waste water dumping ports on his or her vehicle. I realized, after viewing this trial and error method of vehicle alignment, what was needed was some sort of indicator which would protrude from the side of the vehicle at the exact location of the fueling and dumping ports. This indicator would give the driver of the vehicle a clear view of the location of the port in relationship to the fueling or dumping station, thus allowing the driver precise alignment without the need for repeated attempts.

SUMMARY OF THE INVENTION

This invention is comprised of a flag, or any brightly-colored object which is large enough to be visible from the driver's seat, and a means of attaching the flag to the vehicle. The invention can be attached directly to the filling or dumping port on the vehicle, or can be attached to the side or bottom of the vehicle at a point which is directly in line vertically with the port. The invention can be removable, only to be attached when it is need, or it can be permanently affixed to the vehicle with the flag or indicator portion of the invention being deployed or extended remotely by the driver when it is needed.

DESCRIPTION OF THE PREFERRED EMBODIMENTS OF THE INVENTION

Figure 1A:
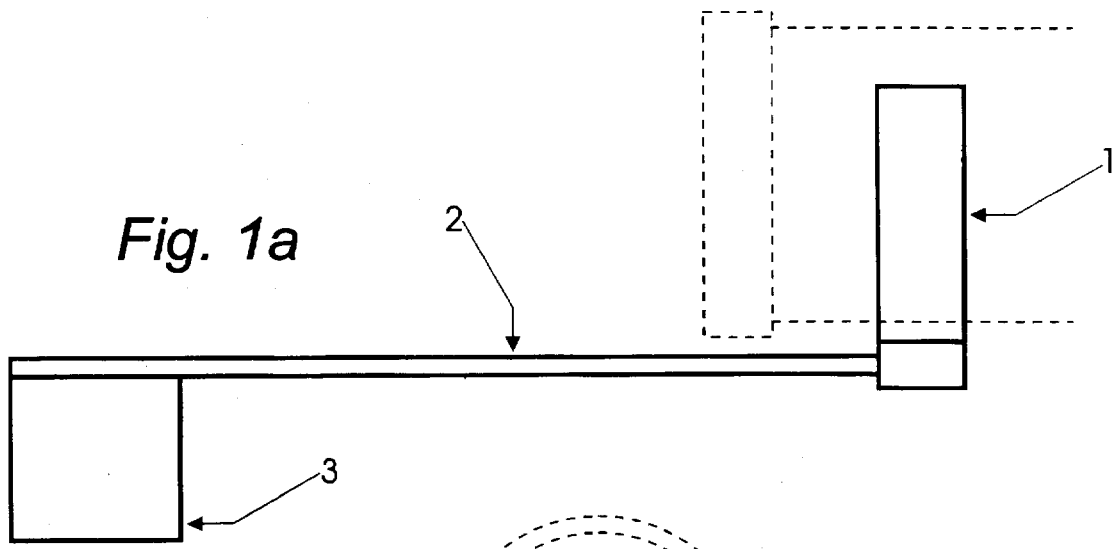
FIG. 1a is the rear view of the temporarily attached version of the invention.
Figure 1B:
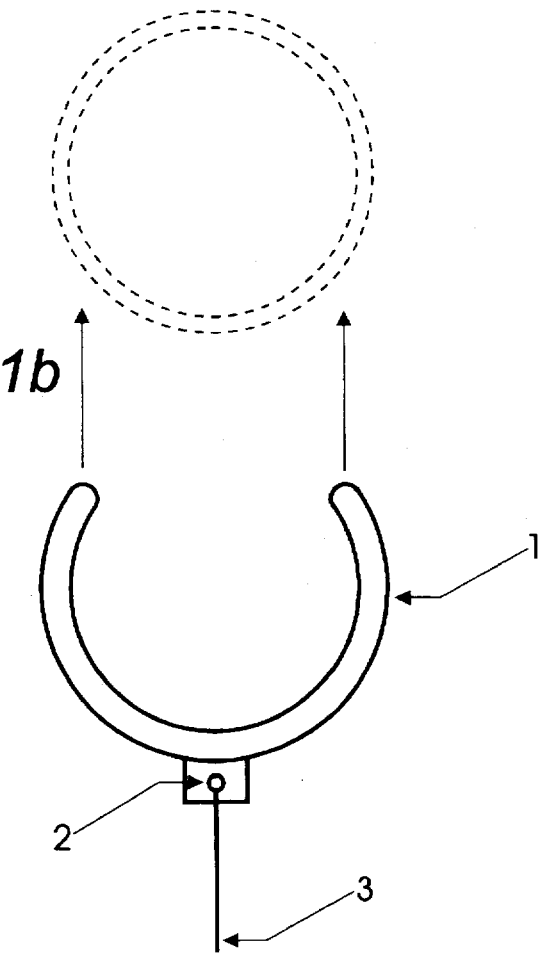
FIG. 1b is the side view of the temporarily attached version of the invention.

Referring to FIGS. 1a, 1b, and 1c are the side, top, and rear views of the temporarily removable and attachable version of the invention. This version is comprised of: an attaching ring 1 to attach the invention to the waste water drain fitting; an indicator which is comprised of a mast 2, which extends a flag out from the side of the vehicle, and a flag 3. When deployed, the indicator will be visible from the driver's seat of the vehicle, indicating the location of a target on the vehicle. A target is a feature or point where an apparatus such as a hose or wire is attached to, or inserted into, a vehicle for the purpose of filling or draining fluids, or making an electrical connection. In this case the target is the waste water drain fitting. This invention is used when a large bodied vehicle such as a car, truck, motor home, camper, or trailer is approaching a waste water dumping station. To use this invention, the driver or other occupant of a vehicle will attach (in some way adhere) the invention, by means of the attaching ring 1, to the neck of the waste water drain fitting (usually located at the left rear of the vehicle). With the invention firmly attached to the drain fitting, and the assembled mast 2 and flag 3 protruding out from the side of the vehicle, the location (exact point of attachment to the vehicle) of the drain fitting will be visible from the drivers seat, thus allowing the driver to align the drain fitting of the vehicle with the waste water dumping station receptacle. Once this alignment is completed, the invention is then removed, and the waste water draining procedure begins. Since the fuel refilling port and external electricity connections are usually located very near to the waste water drain, this invention can also be used to align the vehicle for refueling and receiving electric power.

The materials used in the construction of this version of the invention are not critical because the device does not need to withstand any significant type of chemical or structural stresses. The main consideration in selecting materials is ease and cost of construction. The attaching ring 1 should be constructed of a semi rigid material such as plastic or metal. ABS plastic was selected because it is inexpensive to purchase, easy to machine, and has sufficient structural integrity to accept attachment of the flag mast 2. The material for construction of the flag mast is not critical. It can be rigid or flexible. The major consideration in choosing the material is the ease and efficiency of affixing the mast to the attaching ring and the flag. A semi rigid steel wire was chosen. The construction of the flag 3 can be flexible or rigid. The main considerations are cost and ease of affixing it to the mast. A flexible sheet plastic was chosen.

Figure 2A:
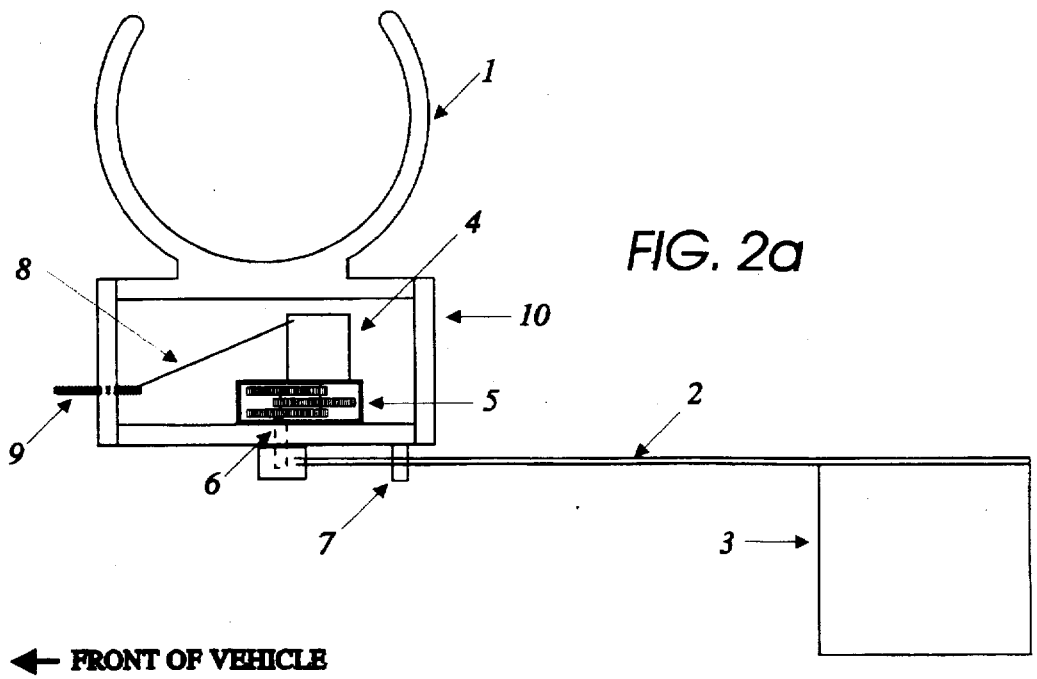
FIG. 2a is the side view of the permanently attached, remotely operated version of the invention.
Figure 2B:
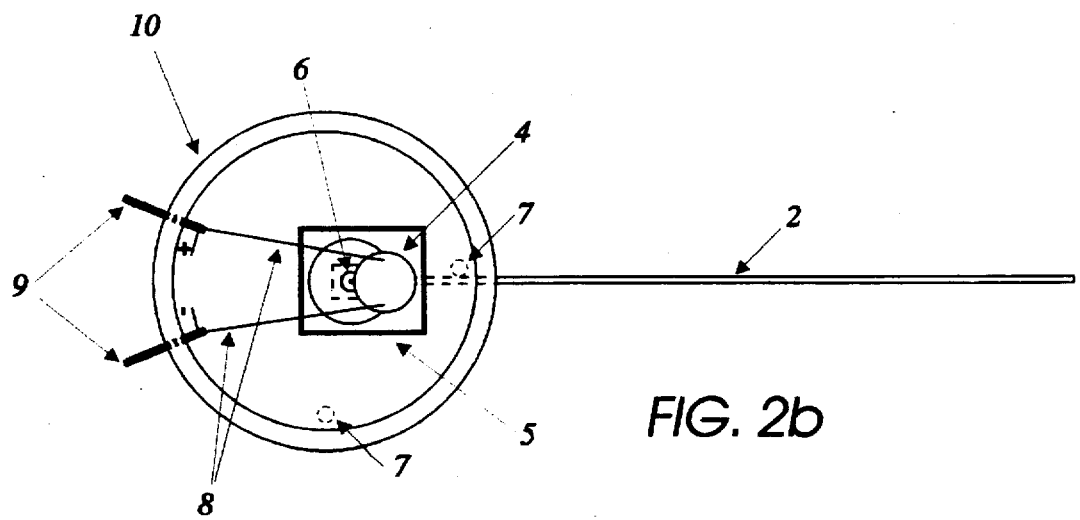
FIG. 2b is the top view of the permanently attached, remotely operated version of the invention.
Figure 3A:
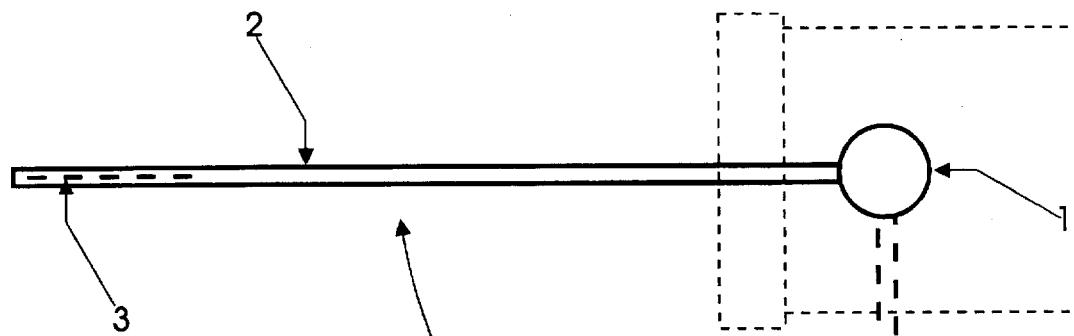
FIG. 3a is the top view of the permanently attached, manually rotated version of the invention.
Figure 3B:
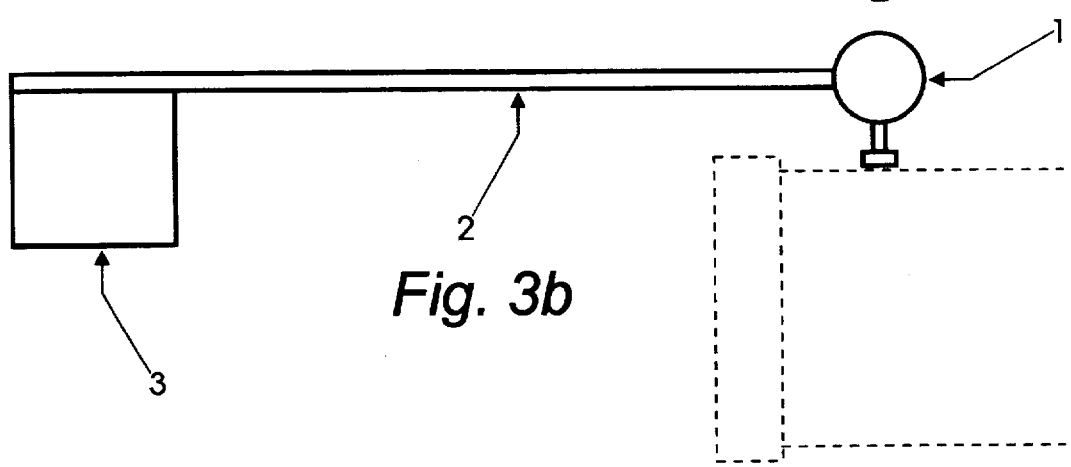
FIG. 3b is the rear view of the permanently attached, manually rotated operated version of the invention.
Figure 4A:
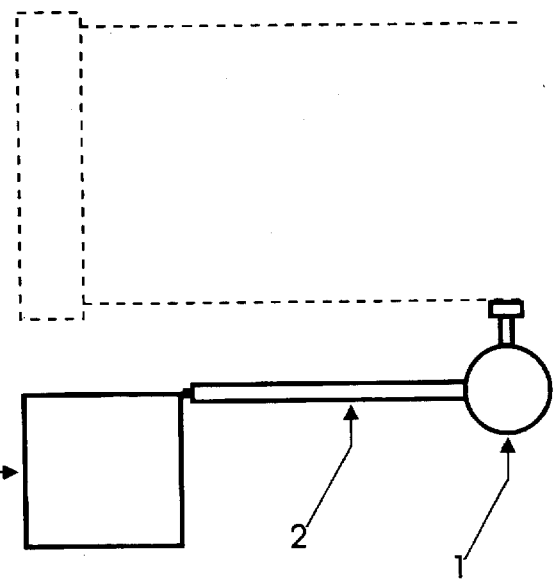
FIG. 4a is the rear view of the permanently attached, manually telescoping version of the invention shown in its retracted position
Figure 4B:
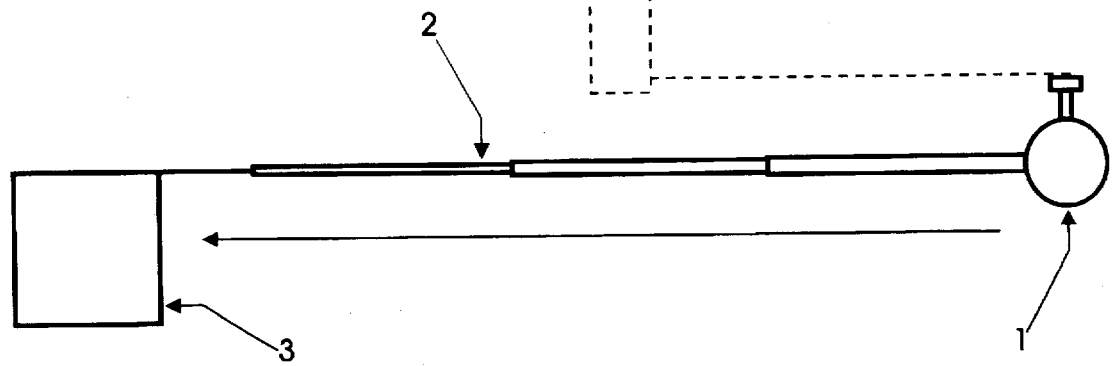
FIG. 4b is the rear view of the permanently attached, manually telescoping version of the invention shown in its extended position.
Figure 5:
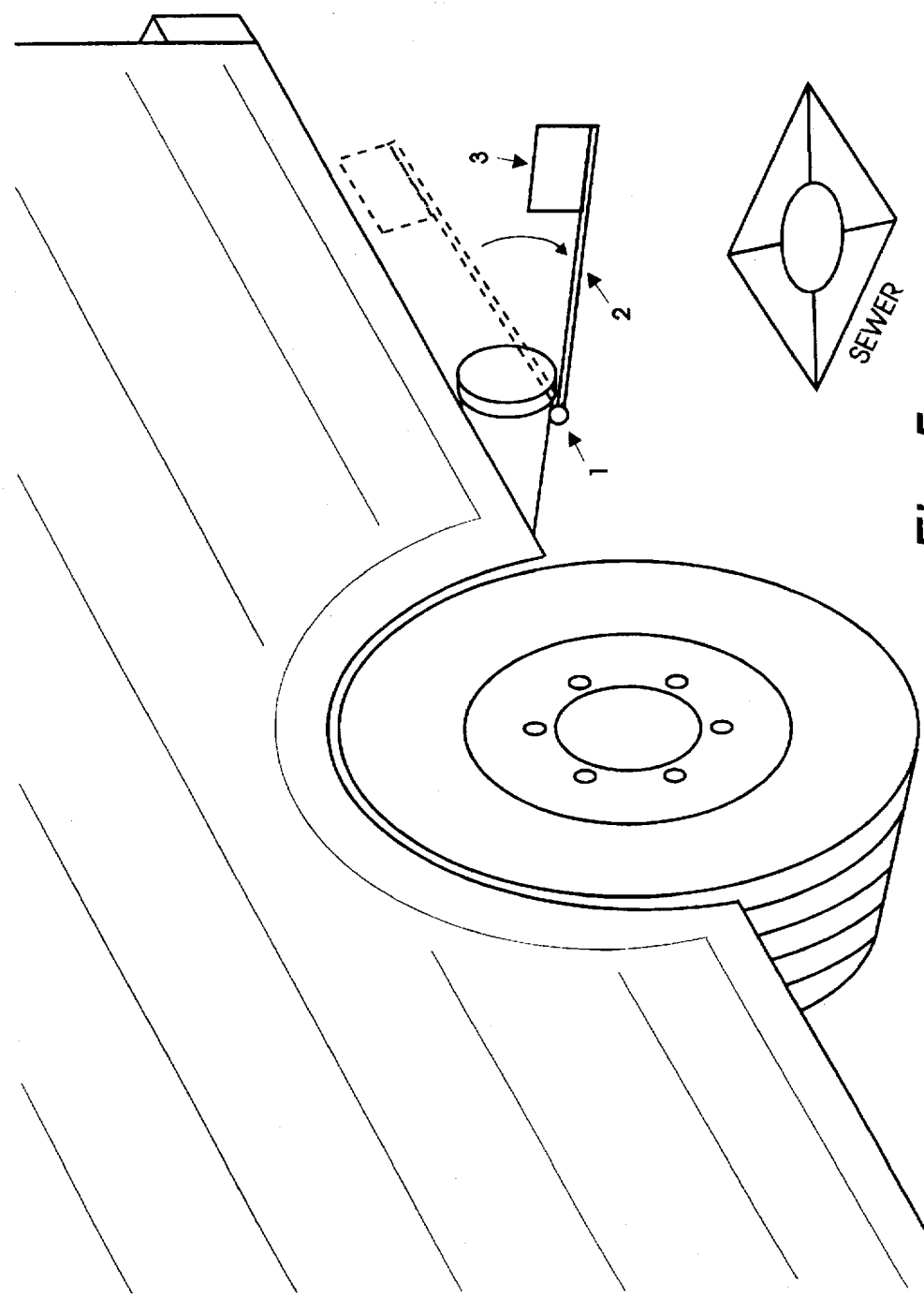
FIG. 5 is the isometric view of the permanently attached, manually rotated version of the invention showing how it works in relation to the vehicle and the waste water dump.

Referring to FIGS. 2a and 2b show the side and top views of the permanently-attached, remote control version of the invention. The term "permanently attached" means that the invention is glued, strapped, bolted, or harnessed to the vehicle at the target point, and is not removed between uses.

The term "remote control" means that the indicator is not deployed by being manually moved to its operating position. Instead, it is deployed from within the vehicle by means of an electrical, mechanical, pneumatic, or hydraulic switch. The deploying of the indicator is the action which occurs or which must occur in order for the indicator to be moved from its resting, hidden, non-attached, or non-deployed state or position, to its active or deployed state or position. In the deployed state, the indicator is visible from the driver's seat and can serve its function of indicating the location of a target on the vehicle. This version is comprised of: a mounting ring 1 for attaching the invention to the waste water drain fitting; drive motor 4 to provide rotation to the flag assembly; reduction gear assembly 5 to reduce the speed of rotation and increase the torque from the motor 4; drive shaft 6 which rotates the flag mast 2; flag mast 2 which extends the flag; flag 3 which is visible from the driver's seat when the invention is activated; electrical connections 9 which direct electrical current to the drive motor from the vehicle's 12 volt power supply through a double-throw double-pole switch mounted on the vehicle's dash board; motor wires 8 which link the electrical connections 9 to the motor 4; rotation control pins 7 which limits the rotation of the drive shaft 6 to 90 degrees; housing 10 which keeps the internal assembly dry and dirt free.

This remotely-activated, permanently-attached version of the invention serves the same purpose as the clip-on version of the invention, that is, to provide a visual indication of the location of the waste water drain fitting and the fuel refilling ports which are not directly visible from the driver's seat of a large vehicle. As the description indicates, this version of the invention is permanently attached to the under side of the waste water drain fitting. This permanent attachment is made by chemically bonding, strapping or bolting the attaching ring 1 to the waste water drain fitting. In the resting or non-deployed position, the mast 2 and flag 3 assembly are parallel to, and slightly inboard the side of the vehicle. When the dash board switch (remote control) is activated, the drive motor 4 and reduction gear assembly 5 cause the mast 2 and flag 3 assembly to rotate 90 degrees along a plane with the axis of the rotation being the drive shaft 6. This rotational motion moves the mast 2 and flag 3 assembly to the deployed position which is perpendicular to, and outside of the side of the vehicle. In this position the locations of the drain fitting and the fueling ports are visible from the driver's seat. After the driver has aligned the vehicle to the appropriate dumping or fueling station, the dash board switch is then thrown to the opposite pole. This reverses the direction of the drive motor 4, which results in the mast 2 and flag 3 assembly to be rotated back to the resting or non-deployed position. Although not shown in the FIGS. 2a and 2b version of this invention, deployment of the indicator may also be accomplished by means of linear motion along the axis of the mast. In this case the indicator would be perpendicular to, and inside of the side of the vehicle in its non-deployed state. When deployed, the indicator would be extended out from the side of the vehicle, all the time remaining perpendicular to the side of the vehicle.

The construction materials for this version of the invention are somewhat more critical than those of the clip-on version. Since this version is permanently attached to the vehicle, it must be able to withstand water, road din, and wind. The mounting ring 1 and the housing 10 should be of ABS plastic construction. This material is strong, U.V. light resistant, and bonded together chemically to form a weather tight seal. Another advantage of using ABS plastic for these parts is that this is the same material used in the construction of most of the waste water drain fittings to which the invention is to be attached. By using like materials, the chemical bonding of the mounting ring to the drain fitting should be very sound. The materials used for the internal parts is not critical as they are not under any significant chemical or mechanical stress. It is advantageous to use materials which are water and dirt resistant which is why ABS plastic was chosen for internal parts 5,6. The mast 2 and the flag 3 should be rigid or semi rigid so they will not be damaged by wind. They should also be water, dirt, and U.V. light resistant. ABS plastic was chosen for both parts, the flag being of white ABS for high visibility.

CONCLUSION

There can be many variations of both versions of the invention. The clip-on version, or one which is attached and detached before and after each use has two major variations, these being the means of attachment and the location of attachment. The means of attachment can be with a magnetic device, a suction device, a hook-and-loop device, or a mechanically interlocking device such as a screw-into-nut or shaft-into-socket. The second major variation is the location of attachment. To achieve proper alignment, the invention should be located either directly to, or in a vertical plane with the waste water fitting. With this in mind, the invention could be attached to any part of the fitting such as the neck, cap or valve. It could also be attached to the side of the vehicle's coachwork, under carriage, or frame. Another variation can be that of the design of the flag. Since the purpose of the flag is visibility, the size, shape, and color of the flag or indicator is free, as long as it serves its purpose. Possible variations include a ball, a streamer, or any shaped flag.

The permanently attached, remotely-activated version of the invention can also be of many various designs. The possible methods and locations of attachment and indicator flag design are similar to those mentioned for the removable version. The method for deploying the indicator flag include telescopic, vertical rotation, and horizontal rotation. These can be achieved by utilizing electric motors, solenoids, electromagnetic triggers, pneumatics, hydraulics, or purely mechanical means such as cable or spring activation.

What is claimed is:

1. A method for visually indicating to a vehicle driver the location of one of a vehicle drain fitting, refilling port and external electricity connection comprising the steps of:

providing an indicator, said indicator comprising a flag and mast attached thereto; said indicator having means for attaching the indicator to a selected one of said fitting, port and connection and means for moving the indicator between a non-deployed position wherein the flag is out of the view of a vehicle driver to a deployed position wherein the flag is within the view of a vehicle driver;

attaching said indicator to a selected one of said fitting, port and connection; and moving said indicator into the deployed position to thereby indicate to a vehicle driver the location of the selected one of said fitting, port and connection.

2. The method of claim 1, wherein the moving means comprises means to facilitate manual rotation of the mast and flag along a plane between deployed and non-deployed positions.

3. The method of claim 1, wherein the moving means comprises means for remotely rotating the indicator along a plane between the deployed and non-deployed positions.

4. The method of claim 1, wherein the moving means comprised means to facilitate manual extension and retraction of the indicator in a linear motion along the axis of the mast.

5. A device for visually indicating to a vehicle driver the location of one of a vehicle drain fitting, refilling port and external electricity connection comprising:

an indicator in the form of a flag and mast attached thereto;

means for attaching the indicator to a selected one of said fitting, port and connection;

means for moving the indicator between a non-deployed position where the flag is out of the view of the vehicle driver to a deployed position where the flag is in the view of the vehicle driver; and wherein the moving means comprises means for remotely rotating the indicator along a plane between the non-deployed and deployed positions.

* * * * *